United States Patent
Zurn et al.

(10) Patent No.: US 11,686,234 B2
(45) Date of Patent: Jun. 27, 2023

(54) EXHAUST TREATMENT SYSTEM FOR WORK VEHICLES AND RELATED FLOW MIXERS

(71) Applicant: CNH Industrial America LLC, New Holland, PA (US)

(72) Inventors: Daniel J. Zurn, West Fargo, ND (US); Derek Thomas Jennen, Moorhead, MN (US); Panos Tamamidis, Northbrook, IL (US); James Patrick Boeshans, Hawley, MN (US); Daniel Braginsky, Forest Park, IL (US); Noah Stocker, Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/505,927

(22) Filed: Oct. 20, 2021

(65) Prior Publication Data

US 2023/0122951 A1  Apr. 20, 2023

(51) Int. Cl.
*F01N 3/20* (2006.01)
*F01N 3/28* (2006.01)
(Continued)

(52) U.S. Cl.
CPC ....... *F01N 3/2066* (2013.01); *B01D 53/9418* (2013.01); *B01D 53/9431* (2013.01);
(Continued)

(58) Field of Classification Search
CPC combination set(s) only.
See application file for complete search history.

(56) References Cited

U.S. PATENT DOCUMENTS 8,966,965 B2  3/2015  Driscoll et al.
8,999,276 B1  4/2015  Bui
(Continued)

FOREIGN PATENT DOCUMENTS

CN  211314339 U  8/2020
EP  2148053 B1  6/2014
(Continued)

OTHER PUBLICATIONS

Vedagiri Praveena, et al., "Characterization of urea SCR using Taguchi technique and computational methods," Environmental Science and Pollution Research International vol. 28, Issue 10, Mar. 2021 (2 pages) https://dialog.proquest.com/professional/printviewfile.
(Continued)

*Primary Examiner* — Binh Q Tran
(74) *Attorney, Agent, or Firm* — Rickard Demille; Rebecca Henkel

(57) ABSTRACT

An exhaust treatment system for a work vehicle includes a selective catalytic reduction (SCR) system having an SCR outlet for expelling treated exhaust flow therefrom, a flow conduit in fluid communication with the outlet, an exhaust sensor positioned within the flow conduit downstream of the outlet, and a flow mixer positioned upstream of the exhaust sensor. The flow mixer has an end wall defining sector openings circumferentially extending between first and second sector sides and radially between radially inner and outer sector ends. Moreover, the flow mixer has swirler vanes, where each of the swirler vanes extends circumferentially from the first sector side of a respective one of the sector openings and radially between radially inner and outer vane ends. Particularly, the radially outer vane end of each of the swirler vanes is spaced apart from the radially outer sector end of the respective one of the sector openings.

20 Claims, 5 Drawing Sheets

(51) Int. Cl.
   *F01N 13/00*   (2010.01)
   *B01D 53/94*   (2006.01)
   *B01F 23/213*  (2022.01)
   *B01F 25/31*   (2022.01)
   *B01F 25/431*  (2022.01)
   *F01N 13/08*   (2010.01)
   *F01N 1/08*    (2006.01)

(52) U.S. Cl.
   CPC ...... *B01D 53/9495* (2013.01); *B01F 23/2132* (2022.01); *B01F 25/31* (2022.01); *B01F 25/431* (2022.01); *F01N 3/2892* (2013.01); *F01N 13/008* (2013.01); *B01F 25/43171* (2022.01); *F01N 1/088* (2013.01); *F01N 3/206* (2013.01); *F01N 3/208* (2013.01); *F01N 13/082* (2013.01); *F01N 2240/20* (2013.01); *F01N 2330/38* (2013.01); *F01N 2610/08* (2013.01); *F01N 2610/146* (2013.01); *F01N 2610/1453* (2013.01); *F01N 2900/1402* (2013.01)

(56) References Cited

U.S. PATENT DOCUMENTS

| | | | |
|---|---|---|---|
| 9,453,444 B2* | 9/2016 | Fischer | B01F 25/4315 |
| 9,945,278 B2 | 4/2018 | Wright et al. | |
| 10,024,217 B1* | 7/2018 | Johnson | B01D 53/9431 |
| 10,632,430 B1* | 4/2020 | Liu | F01N 3/2066 |
| 10,711,677 B2 | 7/2020 | Noren, IV et al. | |
| 10,934,918 B1* | 3/2021 | Goffe | B01D 53/9427 |
| 11,300,025 B2* | 4/2022 | Volmerding | B01F 25/25 |
| 2009/0266064 A1* | 10/2009 | Zheng | B01F 25/25 |
| | | | 60/317 |
| 2016/0361694 A1* | 12/2016 | Brandl | F01N 3/021 |
| 2020/0378291 A1 | 12/2020 | Abbassi et al. | |

FOREIGN PATENT DOCUMENTS

| | | |
|---|---|---|
| SE | 202050184 A1 | 12/2020 |
| WO | WO2020015861 | 1/2020 |

OTHER PUBLICATIONS

Ghazanfar Mehdi, et al., "Numerical Investigation of SCR Mixer Design Optimization for Improved Performance," Mar. 22, 2019 (22 pages) https://www.mdpi.com/2227-9717/7/3/168/pdf.

* cited by examiner

EXHAUST TREATMENT SYSTEM FOR WORK VEHICLES AND RELATED FLOW MIXERS

FIELD OF THE INVENTION

The present subject matter relates generally to the treatment of engine exhaust gases, and more particularly, to exhaust treatment systems of work vehicles for improving mixing of exhaust gases before the exhaust gases reach an exhaust sensor, such as a nitrogen oxide (NOx) sensor. In addition, the present subject matter relates to flow mixer configurations for use within an exhaust treatment system for a work vehicle.

BACKGROUND OF THE INVENTION

Typically, work vehicles, such as tractors and other agricultural vehicles, include an exhaust treatment system for controlling engine emissions. As is generally understood, exhaust treatment systems for work vehicles often include a diesel oxidation catalyst (DOC) system in fluid communication with a selective catalytic reduction (SCR) system. The DOC system is generally configured to oxidize carbon monoxide and unburnt hydrocarbons contained within the engine exhaust and may include a mixing chamber for mixing an exhaust reductant, such as a diesel exhaust fluid (DEF) or any other suitable urea-based fluid, into the engine exhaust. For instance, the exhaust reductant is often pumped from a reductant tank mounted on and/or within the vehicle and injected into the mixing chamber to mix the reductant with the engine exhaust. The resulting mixture may then be supplied to the SCR system to allow the reductant to be reacted with a catalyst in order to reduce the amount of nitrogen oxide (NOx) emissions contained within the engine exhaust. A NOx sensor is typically positioned downstream of the SCR system to monitor the amount of NOx emissions still remaining in the exhaust flow exiting the exhaust treatment system. The data from the sensor may, for example, be used to control the combustion temperature of the engine and/or the amount of reductant injected into the mixing chamber to ensure that the amount of NOx emissions remains below a given amount.

In many instances, the NOx sensor is positioned close to the outlet of the SCR system. As such, the exhaust gases from different substrate channels do not have time to sufficiently mix before reaching the NOx sensor. As such, the NOx sensor tends to read exhaust gases from only one substrate channel, which significantly reduces the accuracy of the sensor readings and thus, the overall performance of the treatment system.

Accordingly, an improved exhaust treatment system for work vehicles and related flow mixers would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an exhaust treatment system for a work vehicle. The system may include a selective catalytic reduction (SCR) system configured to react a mixture of exhaust reductant and engine exhaust with a catalyst to generate a treated exhaust flow, with the SCR system including an SCR outlet for expelling the treated exhaust flow therefrom. The system may further include a flow conduit in fluid communication with the SCR outlet for receiving the treated exhaust flow expelled from the SCR system. Further, the system may include an exhaust sensor positioned within the flow conduit downstream of the SCR outlet, with the exhaust sensor being configured to detect an amount of an emission gas present in the treated exhaust flow. Additionally, the system may include a flow mixer positioned upstream of the exhaust sensor. The flow mixer may have an end wall defining sector openings extending in a circumferential direction of the flow mixer between a first sector side and a second sector side and in a radial direction of the flow mixer between a radially inner sector end and a radially outer sector end. Moreover, the flow mixer may have a plurality of swirler vanes, where each of the plurality of swirler vanes extends in the circumferential direction from the first sector side of a respective one of the sector openings and in the radial direction between a radially inner vane end and a radially outer vane end. Particularly, the radially outer vane end of each of the plurality of swirler vanes may be spaced apart in the radial direction from the radially outer sector end of the respective one of the sector openings. As such, the plurality of swirler vanes is configured to impart a spiraling flow trajectory to the treated exhaust flow flowing from the SCR to the exhaust sensor.

In another aspect, the present subject matter is directed to an exhaust treatment system for a work vehicle. The system may include a selective catalytic reduction (SCR) system configured to react a mixture of exhaust reductant and engine exhaust with a catalyst to generate a treated exhaust flow, where the SCR system includes an SCR outlet for expelling the treated exhaust flow therefrom. The system may further include a flow conduit in fluid communication with the SCR outlet for receiving the treated exhaust flow expelled from the SCR system. Further, the system may include an exhaust sensor positioned within the flow conduit downstream of the SCR outlet, with the exhaust sensor being configured to detect an amount of an emission gas present in the treated exhaust flow. Additionally, the system may include a flow mixer positioned upstream of the exhaust sensor, with the flow mixer extending between an upstream end and a downstream end along an axial direction. The flow mixer may have a sidewall extending between the upstream and downstream ends, with the sidewall defining a plurality of sidewall openings. Each of the plurality of sidewall openings may extend in the axial direction across a first axial range. Further, the flow mixer may have an end wall coupled to the sidewall proximate the upstream end, the end wall defining sector openings. Additionally, the flow mixer may have a plurality of swirler vanes, where each of the plurality of swirler vanes extends in a circumferential direction of the flow mixer from adjacent a respective one of the sector openings and in the axial direction across a second axial range, with the first axial range at least partially overlapping the second axial range. The plurality of swirler vanes is configured to impart a spiraling flow trajectory to the treated exhaust flow flowing from the SCR to the exhaust sensor.

In an additional aspect, the present subject matter is directed to a flow mixer for use within an exhaust treatment system of a work vehicle. The flow mixer may have a sidewall extending between an upstream end and a downstream end along an axial direction, where the sidewall defines a plurality of sidewall openings. Each of the plurality of sidewall openings extends in the axial direction across a first axial range. Further, the flow mixer may include an end wall coupled to the sidewall proximate the upstream end, with the end wall defining sector openings extending in a radial direction of the flow mixer across a first radial distance. Additionally, the flow mixer may have a plurality of swirler vanes, with each of the plurality of swirler vanes extending in a circumferential direction of the flow mixer from a respective one of the sector openings and in the radial direction across a second radial distance and in the axial direction across a second axial range. Particularly, the second radial distance is less than the first radial distance, and the first axial range at least partially overlaps the second axial range.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
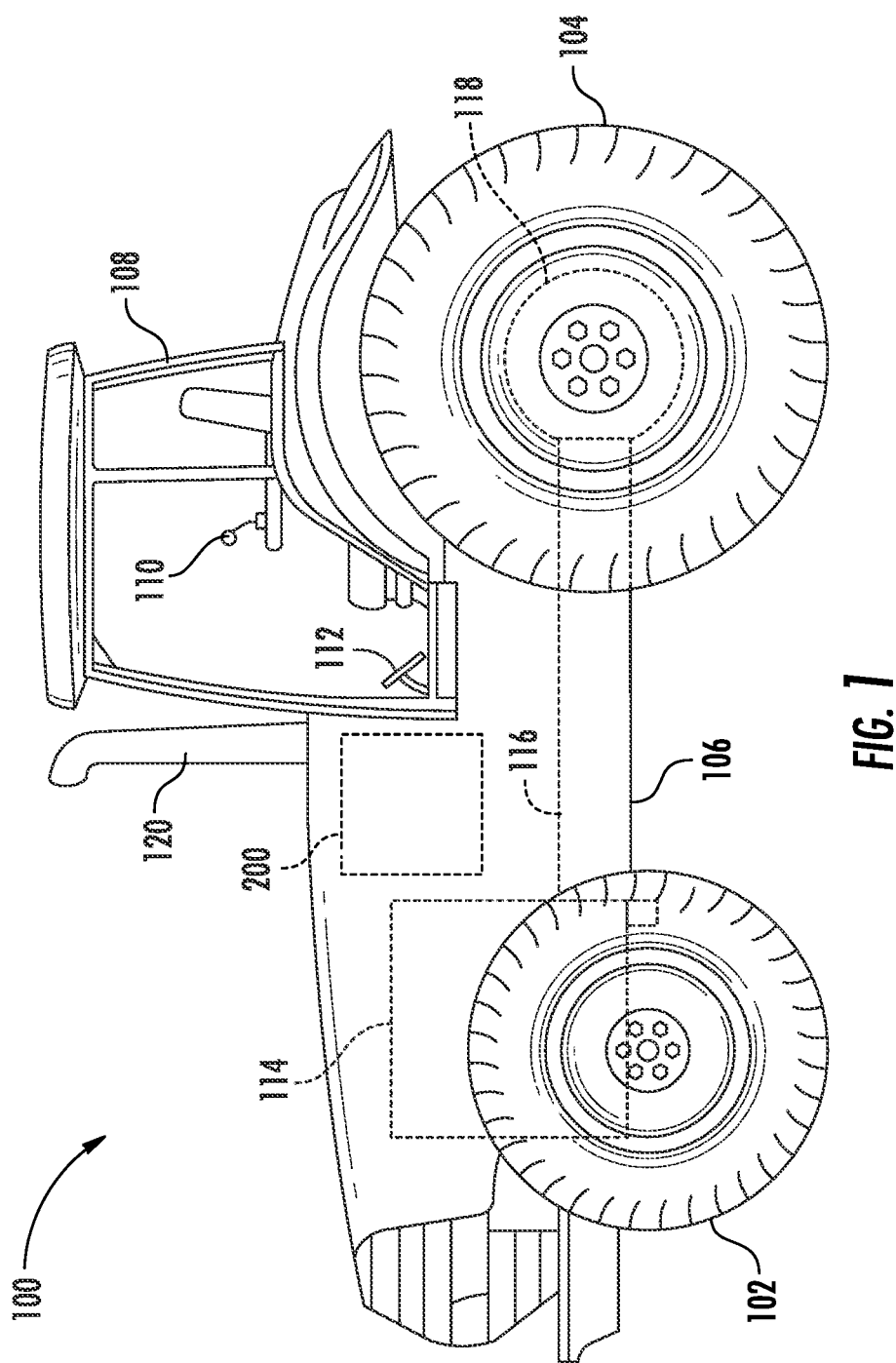
FIG. 1 illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an exhaust treatment system for a work vehicle. In several embodiments, the exhaust treatment system includes a flow mixer adapted to increase the mixing of exhaust gases from different substrate channels exiting a selective catalytic reduction (SCR) system before the exhaust gases reach a sensor, such as a nitrogen oxide (NOx) sensor. For example, the flow mixer may be positioned at a location upstream of the exhaust sensor such that the mixer imparts a spiraling flow trajectory to the flow of treated exhaust from the SCR system. In one embodiment, the flow mixer has an end wall that defines a plurality of sector openings. The flow mixer further has swirler vanes, where each of the swirler vanes extends from a respective one of the plurality of sector openings. Particularly, in some embodiments, each swirler vane only extends over part of the radial distance across which the respective sector openings extends. For example, in some embodiments, a radially outer end of each of the vanes may be spaced apart from a radial outer end of the respective one of the plurality of sector openings. Further, the flow mixer may include a sidewall extending between the upstream and downstream ends, where the sidewall similarly defines a plurality of circumferentially spaced sidewall openings. The sidewall openings and the vanes at least partially overlap along an axial direction of the flow mixer. The end wall, in such embodiments, may be coupled to the sidewall proximate an upstream end of the flow mixer.

Exhaust gases may flow through the sector openings and the sidewall openings to exit the SCR system, where the swirler vanes create a spiral flow of the exhaust gases to better mix the exhaust gases before the exhaust gases flow past the exhaust sensor. As such, the NOx sensor may more accurately monitor the amount of NOx emissions remaining in the exhaust flow based at least in part on the mixed exhaust gases. Additionally, due to the relatively open configuration of the flow mixer by having such sector and sidewall openings, mixing of the exhaust gases is accomplished with very little backpressure being created in the exhaust treatment system.

Referring now to the drawings, FIG. 1 illustrates a side view of one embodiment of a work vehicle 100. As shown, the work vehicle 100 is configured as an agricultural tractor. However, in other embodiments, the work vehicle 100 may be configured as any other suitable work vehicle known in the art, such as various other agricultural vehicles, earth-moving vehicles, road vehicles, all-terrain vehicles, off-road vehicles, loaders, and/or the like.

As shown in FIG. 1, the work vehicle 100 includes a pair of front wheels 102, a pair of rear wheels 104, and a chassis 106 coupled to and supported by the wheels 102, 104. An operator's cab 108 may be supported by a portion of the chassis 106 and may house various control devices 110, 112 (e.g., levers, pedals, control panels and/or the like) for permitting an operator to control the operation of the work vehicle 100. Additionally, the work vehicle 100 may include an engine 114 and a transmission 116 mounted on the chassis 106. The transmission 116 may be operably coupled to the engine 114 and may provide variably adjusted gear ratios for transferring engine power to the wheels 104 via a differential 118.

Moreover, the work vehicle 100 may also include an exhaust treatment system 200 for reducing the amount of emissions contained within the exhaust from the engine 114. For instance, engine exhaust expelled from the engine 114 may be directed through the exhaust treatment system 200 to allow the levels of nitrogen oxide (NOx) emissions contained within the exhaust to be reduced significantly. The cleaned or treated exhaust gases may then be expelled from the exhaust treatment system 200 into the surrounding environment via an exhaust pipe 120 of the work vehicle 100.

It should be appreciated that the configuration of the work vehicle 100 described above and shown in FIG. 1 is provided only to place the present subject matter in an exemplary field of use. Thus, it should be appreciated that the present subject matter may be readily adaptable to any manner of work vehicle configuration 100. For example, in an alternative embodiment, a separate frame or chassis may be provided to which the engine 114, transmission 116, and differential 118 are coupled, a configuration common in smaller tractors. Still other configurations may use an articulated chassis to steer the work vehicle 100, or rely on tracks in lieu of the wheels 102, 104. Additionally, although not shown, the work vehicle 100 may also be configured to be operably coupled to any suitable type of work implement, such as a trailer, spray boom, manure tank, feed grinder, plow and/or the like.

Figure 2:
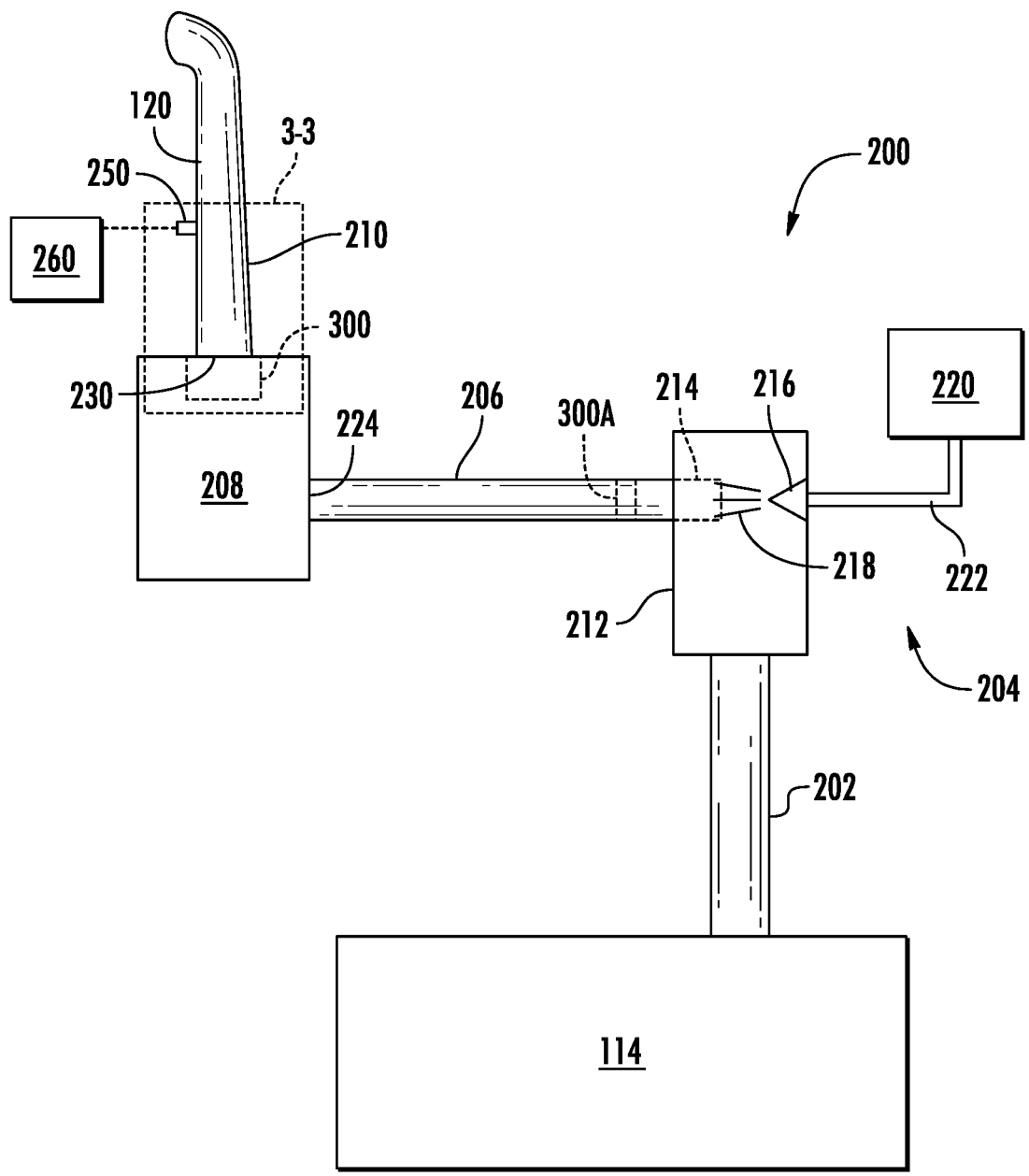
FIG. 2 illustrates a schematic view of one embodiment of an exhaust treatment system suitable for use with a work vehicle in accordance with aspects of the present subject matter.

Referring now to FIG. 2, a schematic diagram of one embodiment of an exhaust treatment system 200 suitable for use with a work vehicle 100 is illustrated in accordance with aspects of the present subject matter. As represented in FIG. 2, the exhaust treatment system includes an exhaust conduit 202, a diesel oxidation catalyst (DOC) system 204, a mixing conduit 206, a selective catalytic reduction (SCR) system 208, and a treated exhaust flow conduit 210. During operation of the work vehicle 100, exhaust expelled from the engine 114 is received by the exhaust conduit 202 and flows through the conduit 202 to the DOC system 204. As is generally understood, the DOC system 204 is configured to reduce the levels of carbon monoxide and hydrocarbons present in the engine exhaust. For example, as shown in FIG. 2, the DOC system 204 includes a canister or chamber 212 for receiving engine exhaust from the exhaust conduit 202, with the chamber 212 being in flow communication with an upstream end 214 of the mixing conduit 206. In addition, the DOC system 204 includes a reductant injector nozzle 216 provided in association with the chamber 212 at a location at or adjacent to the upstream end 214 of the mixing conduit 206 to allow an exhaust reductant 218, such as a diesel exhaust fluid (DEF) or any other suitable urea-based fluid, to be injected into the stream of exhaust gases flowing through the chamber 212. For instance, as shown in FIG. 2, the reductant injector nozzle 216 may be fluidly coupled to a source of exhaust reductant (e.g., storage tank 220) via a hose or other fluid coupling 222 to allow liquid exhaust reductant to be supplied to the nozzle 216. The engine exhaust and exhaust reductant flowing into the upstream end 214 of the mixing conduit 206 are then directed through the conduit 206 to the downstream end 224 thereof for receipt by the SCR system 208, within which the mixture of exhaust/reductant is reacted with a catalyst to generate a treated exhaust flow in which the amount of harmful or undesirable gas emissions has been reduced as compared to the engine exhaust initially discharged from the engine 114. The treated exhaust flow is then expelled from an outlet 230 of the SCR system 208 and is directed through the downstream flow conduit 210 for discharge into the atmosphere (e.g., via an exhaust pipe 120 forming part of or coupled to the downstream flow conduit 210).

Additionally, as shown in FIG. 2, the exhaust treatment system 200 includes an exhaust sensor 250 positioned within the downstream flow conduit 210 to monitor the concentration or amount of emissions remaining within the treated exhaust flow following treatment within the SCR system 208. In one embodiment, the exhaust sensor 250 comprises one or more nitrogen oxide (NOx) sensors configured to detect the amount of NOx contained within the treated exhaust flow. However, in other embodiments, the exhaust sensor 250 may comprise any other suitable sensor(s) or combination of sensor(s) configured to detect the concentration or amount of gaseous emissions contained within the treated exhaust flow, including the detection of gaseous emissions other than NOx and/or the detection of NOx in combination with one or more other gaseous emissions. As shown, in FIG. 2, in one embodiment, the exhaust sensor 250 is communicatively coupled to a controller 260 (e.g., a computing device or another other suitable processor-based device) configured to monitor the exhaust emissions contained within the treated exhaust flow based on the data received from the sensor 250. The controller 260 may then, for example, compare the concentration or amount of detected exhaust emissions to a predetermined limit or threshold and control one or more components of the work vehicle 100 based on such comparison, such as by adjusting the combustion temperature of the engine 114 and/or varying the amount of reductant injected into the DOC system 204 to ensure that the exhaust emissions remain below the predetermined limit or threshold.

Moreover, the exhaust treatment system 200 may also include a flow mixer 300 positioned at or adjacent to the outlet 230 of the SCR system 208. As will be described in greater detail below, the flow mixer 300 may be configured to impart a rotating or spiraling flow trajectory to the treated exhaust flow expelled from the SCR system 208, which may facilitate enhanced mixing of the treated exhaust immediately upstream of the exhaust sensor 250, thereby allowing the sensor 250 to provide more accurate data related to the concentration or amount of the gaseous emission(s) (e.g., NOx) being monitored.

Figure 3:
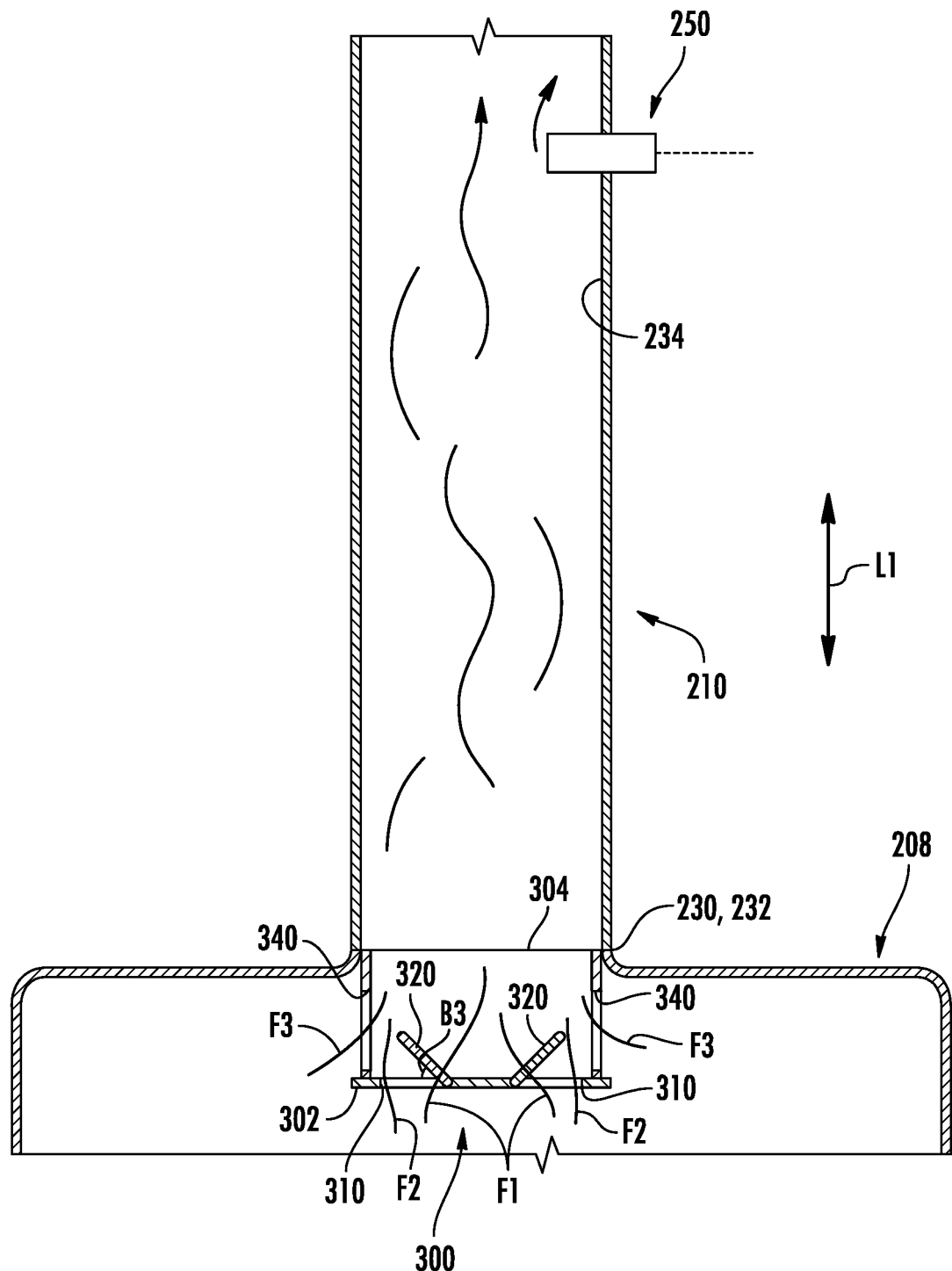
FIG. 3 illustrates a simplified, cross-sectional view of a portion of the exhaust treatment system shown in FIG. 2 within box 3-3, particularly illustrating one embodiment of a flow mixer positioned relative to an outlet of the selective catalytic reduction (SCR) system in accordance with aspects of the present subject matter.

Referring now to FIG. 3, a cross-sectional view of a portion of the exhaust treatment system shown in FIG. 2 within box 3-3 is illustrated in accordance with aspects of the present subject matter, particularly illustrating one embodiment of a flow mixer positioned relative to an outlet of the selective catalytic reduction (SCR) system. As indicated above, in several embodiments, the flow mixer 300 is configured to be positioned at or adjacent to the outlet 230 of the SCR system 208. For example, in the illustrated embodiment, the flow mixer 300 is positioned immediately at the interface between the SCR outlet 230 and an adjacent upstream end 232 of the flow conduit 210. The flow mixer 300 generally extends between an upstream end 302 and a downstream end 304 along an axial direction L1. The downstream end 304 of the flow mixer 300 is configured to be positioned at or adjacent the outlet 230 of the SCR system 208 such that the downstream end 304 of the flow mixer 300 is positioned closer to the outlet 230 than the upstream end 302 of the flow mixer 300. However, in other embodiments, the flow mixer 300 may be positioned at any other suitable location relative to the SCR outlet 230, such as at a location upstream of the interface between the SCR outlet 230 and the upstream end 232 of the flow conduit 210 or at a location downstream of the interface and upstream of the exhaust sensor 250.

Additionally, as shown in FIG. 3, the exhaust sensor 250 may be configured to extend radially inwardly from an inner surface 234 of the flow conduit 210 such that at least a portion of the sensor 250 is positioned directly within and/or otherwise directly exposed to the flow of treated exhaust flowing downstream of the mixer 300. In this regard, it should be noted that the exhaust sensor 250 is not shielded or otherwise protected from the flow of treated exhaust via an upstream deflector. Rather, a portion of the treated exhaust flow flows directly into and/or across the exhaust sensor 250 to allow the sensor 250 to provide accurate data relating to the gaseous emission(s) being monitored.

As will be described below in greater detail, the flow mixer 300 has a plurality of openings through which exhaust gases flow before reaching the exhaust sensor 250, and a plurality of vanes for creating a swirling trajectory of the exhaust gases flowing through the flow mixer 300. For instance, a first portion F1 and a second portion F2 of the treated exhaust flow expelled from the SCR system 208 may flow through openings at the upstream end 302 of the flow mixer 300, while a third portion F3 of the treated exhaust flow expelled from the SCR system 208 may flow through openings along a sidewall of the flow mixer 300. The first portion F1 of the exhaust gases may impinge on swirler vanes proximate the openings at the upstream end 302 such that the first portion F1 of the exhaust gases is given a swirling trajectory. The second portion F2 of the exhaust gases may generally flow past the ends of swirler vanes, which also at least partially prevents the third portion F3 of the exhaust gases from being drawn through the swirler vanes. The swirling trajectory of the first portion F1 of the exhaust gases helps to mix the first portion F1 with the other portions F2, F3 of the exhaust gases, while very little backflow pressure is created by the flow mixer 300.

Figure 4:
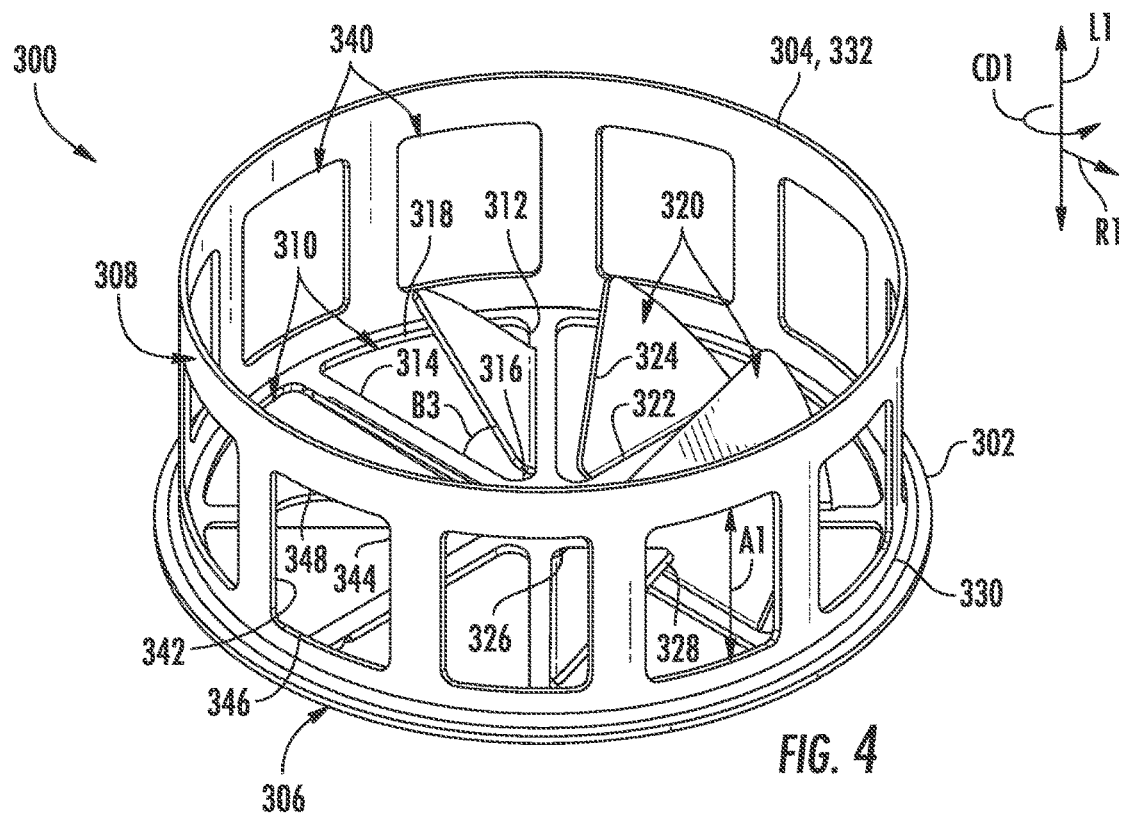
FIG. 4 illustrates a perspective view of one embodiment of a flow mixer suitable for the disclosed exhaust treatment system shown in FIG. 2 in accordance with aspects of the present subject matter.
Figure 5:
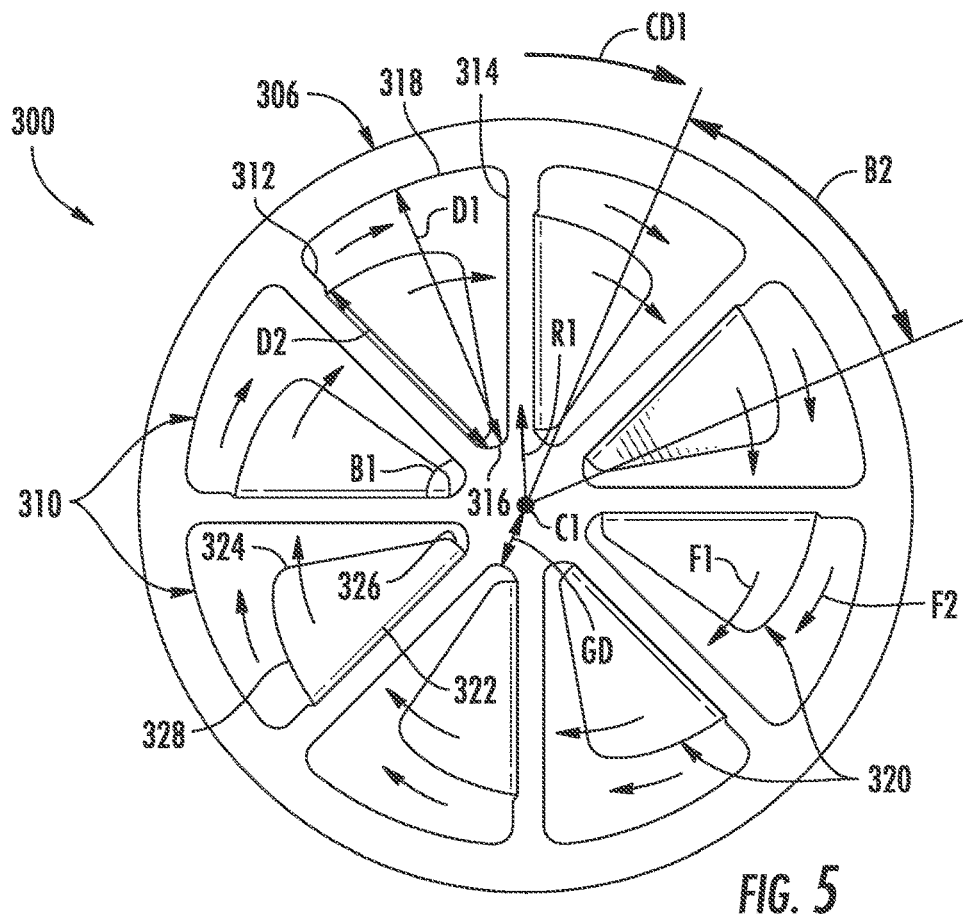
FIG. 5 illustrates a bottom view of the flow mixer shown in FIG. 4 in accordance with aspects of the present subject matter.
Figure 6:
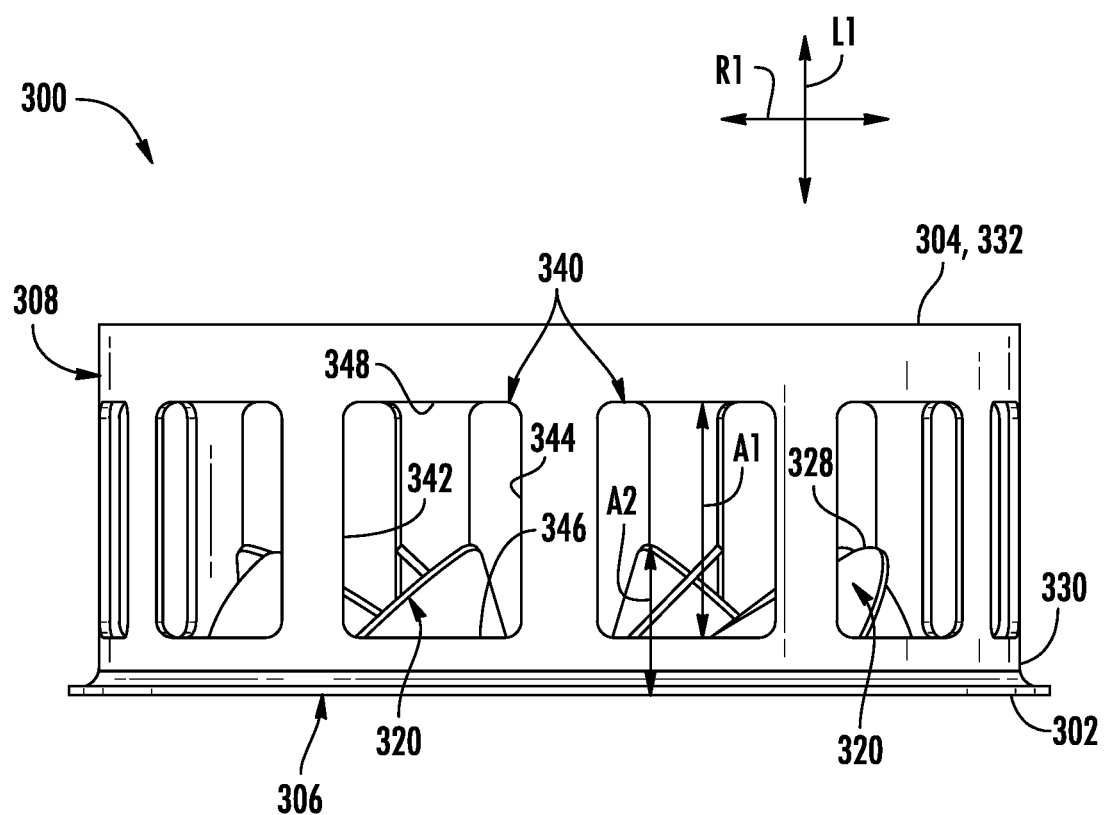
FIG. 6 illustrates a side view of the flow mixer shown in FIG. 4 in accordance with aspects of the present subject matter.

Referring now to FIGS. 4-6, differing views of the flow mixer 300 are illustrated in accordance with the present subject matter. Specifically, FIG. 4 illustrates a perspective view of the flow mixer 300, FIG. 5 illustrates a bottom view of the flow mixer 300, and FIG. 6 illustrates a side view of the flow mixer 300. As shown in FIGS. 4-6, the mixer 300 includes an end wall 306 and a sidewall 308 coupled to the end wall 306, proximate the upstream end 302 of the mixer 300.

As particularly shown in FIGS. 4 and 5, the end wall 306 defines a plurality of sector openings 310. Each of the sector openings 310 extends in a circumferential direction CD1 between a first sector side 312 and a second sector side 314 and extends in a radial direction R1 between a radially inner sector end 316 and a radially outer sector end 318 across a first radial distance D1 (FIG. 5). As particularly shown in FIG. 5, the first sector side 312 of each sector opening 310 extends at a first angle B1 relative to the second sector side 314 such that each sector opening 310 forms a wedge shape, with the sector sides 312, 314 being closer together at the radially inner sector end 316 than at the radially outer sector end 318. The radially inner sector ends 316 of the sector openings 310 are spaced apart radially from a center axis C1 by a gap distance GD. In some embodiments, the sector openings 310 are evenly spaced apart in the circumferential direction CD1 by an angle B2 about the center axis C1 of the end wall 306. However, in one or more embodiments, the sector openings 310 may be spaced apart by varying angles about the center axis C1. In one embodiment, the angle B1 between the first and second sector sides 312, 314 is equal to the angle B2 between sector openings 310. However, in other embodiments, the angles B1, B2 may be different from each other.

It should be appreciated that while the end wall 306 is shown as defining eight sector openings 310, the end wall 306 may define any other suitable number of sector openings 310. For instance, the end wall 306 may instead define two, three, four, five, six, eight or more sector openings 310. Preferably, in some embodiments, the sector openings 310 collectively cover between about 50% and about 70% of the end wall 306, such as between about 55% and about 65% of the end wall 306, such as about 60% of the end wall 306.

As further shown in FIGS. 4-6, the end wall 306 includes a plurality of swirler vanes 320 configured to impart a rotating or spiraling flow trajectory to the treated exhaust flow expelled from the SCR system 208 (FIG. 3). Each of the swirler vanes 320 is associated with a respective one of the sector openings 310. For instance, each swirler vane 320 extends from the first sector side 312 of a respective sector opening 310 at an angle B3 (FIGS. 3 and 4), such that the swirler vanes 320 extend toward the downstream end 304 of the flow mixer 300 and at least partially vertically above the respective sector opening 310. For instance, the angle B3 between the sector openings 310 and the swirler vanes 320 is about 45°. However, it should be appreciated that the swirler vanes 320 may be oriented at any other suitable angle relative to the sector openings 310.

As particularly shown in FIGS. 4 and 5, each swirler vane 320 (also referred to herein as simply "vane 320") extends in the circumferential direction CD1 between a first vane side 322 and a second vane side 324 and extends in the radial direction R1 between a radially inner vane end 326 and a radially outer vane end 328 over a second radial distance D2 (FIG. 5). In one embodiment, a width of each vane 320 between the first and second vane sides 322, 324 corresponds to a width of the respective sector opening 310 between the first and second sector sides 312, 314 along the second radial distance D2 such that the vane 320 would extend fully across the width of the sector opening 310 in the circumferential direction if the vane 320 was not angled relative to the end wall 306 (e.g., at angle B3). The first vane side 322 of each vane 320 is adjacent the first sector side 312 of the respective sector opening 310. Additionally, in one embodiment, the radially inner vane end 326 of the first vane side 322 of each vane 320 may be at the radially inner sector end 316 of the first sector side 312 of the respective sector opening 310.

In some embodiments, the radially outer vane end 328 of each vane 320 is spaced apart from the radially outer sector end 318 of the respective sector opening 310. For instance, in one embodiment, the second radial distance D2 (FIG. 5) is about 80% of the first radial distance D1 (FIG. 5). In such embodiments, the first portion F1 of the treated exhaust flow expelled from the SCR system 208 (FIG. 3) flows through a first portion of sector openings 310 that overlaps with the second radial distance D2, such that the first portion of the treated exhaust flow is given a counter-clockwise rotating or spiraling flow trajectory as it is guided by the vanes 320, while the second portion F2 of the treated exhaust flow expelled from the SCR system 208 (FIG. 3) may flow through a second portion of the sector openings 310 that does not overlap with the second radial distance D2, such that the second portion of the treated exhaust flow flows past the radially outer vane ends 328 of the vanes 320. As the second portion F2 of the treated exhaust flow bypasses the vanes 320, the second portion F2 has a more linear trajectory, which helps to at least partially reduce or avoid backpressure of the flow mixer 300. The swirling trajectory of the first portion F1 causes the second portion F2 to mix into the first portion F1.

In some embodiments, such as the embodiment illustrated, the number of vanes 320 generally matches the number of sector openings 310 such that each sector opening 310 is associated with a respective vane 320. However, it should be appreciated that, in some embodiments, the number of sector openings 310 may be greater than the number of vanes 320 such that some of the sector openings 310 may not have an associated vane 320. Additionally, it should be appreciated that, in general, a higher number of vanes 320 may have a better mixing performance than a smaller number of vanes 320 with the same, total surface area.

As shown in FIGS. 4 and 6, the sidewall 308 generally extends between the upstream end 302 and the downstream end 304 of the flow mixer 300. Particularly, the sidewall 308 extends between a first axial sidewall end 330 and a second axial sidewall end 332, with the first axial sidewall end 330 being proximate the upstream end 302 of the flow mixer 300 and the second axial end 332 being proximate the downstream end 304 of the flow mixer. The end wall 306 is coupled to the sidewall 308 at the first axial sidewall end 330. In one embodiment, the sidewall 308 is annular or cylindrical. However, it should be appreciated that the sidewall 308 may have any other suitable shape.

The sidewall 308 defines a plurality of sidewall openings 340 through which the third portion F3 (FIG. 3) of the treated exhaust flow expelled from the SCR system 208 (FIG. 3) may flow. Each of the sidewall openings 340 extends in the circumferential direction CD1 between a first sidewall side 342 and a second sidewall side 344, and in the axial direction L1 between a first axial sidewall end 346 and a second axial sidewall end 348 over a first axial range A1. In one embodiment, the first and second sidewall sides 342, 344 are parallel to the axial direction L1, while the first and second axial sidewall ends 346, 348 are generally perpendicular to the axial direction L1. As shown in FIG. 4, each of the sector openings 310 is associated with one or more of the sidewall openings 340. For instance, in one embodiment, each of the sector openings 310 is at least partially radially aligned with one or more of the sidewall openings 340. In one embodiment, such as the embodiment shown, the sidewall 308 includes eleven sidewall openings 340 evenly spaced apart about the center axis C1 of the flow mixer 300 in the circumferential direction CD1. However, in other embodiments, the sidewall 308 may include any other suitable number of sidewall openings 340. Preferably, in some embodiments, the sidewall openings 340 collectively cover between about 40% and about 50% of the sidewall 308, such as about 45% of the sidewall 308. It should be appreciated that, as will be described below, the total coverage percentages of the sidewall openings 340 and the sector openings 310 are selected such that the portions of treated exhaust flow through the end wall 306 and the sidewall 308 are approximately equal.

Further, as particularly shown in FIG. 6, the vanes 320 are angled relative to the end wall 306 such that each vane 320 extends in the axial direction L1 from the end wall 306 along a second axial range A2. In one embodiment, the sidewall openings 340 are positioned such that the first and second axial ranges A1 and A2 at least partially overlap. Particularly, the second axial sidewall end 348 of each of the sidewall openings 340 may be spaced axially apart from the radially outer vane ends 328 along the axial direction L1 such that the first axial range A1 extends closer to the downstream end 304 of the flow mixer 300 than the second axial range A2. As such, at least part of the third portion F3 of the treated exhaust flow may enter the flow mixer 300 in the axial gap defined between the radially outer vane ends 328 of the vanes 320 and the second axial sidewall ends 348 of the sidewall openings 340, thereby avoiding the vanes 320. In some embodiments, the remaining part of the third portion F3 of the treated exhaust flow that enters the flow mixer 300 at the vanes 320 may be at least partially guided away from the vanes 320 by the second portion F2 of the treated exhaust flow flowing past the ends of the vanes 320. As such, the second and third portions F2 may mix at the sidewall openings 340, while further mixing with the first portion F1 at a location closer to the downstream end 304 of the flow mixer 300. By allowing the second and third portions F2, F3 of the exhaust gases to at least partially avoid the vanes 320, backpressure of the SCR system 208 is at least partially avoided or reduced.

It should be appreciated that, although the mixer configuration shown in FIGS. 4-6 is generally described herein with reference to mixing the flow of exhaust gases directed between the SCR system 208 and the downstream exhaust sensor 250, the flow mixer 300 may also be utilized in one or more additional locations within the exhaust treatment system 200. For instance, in addition to being located between the SCR system 208 and the downstream exhaust sensor 250 (or as an alternative thereto), the flow mixer 300 may be positioned within the mixing conduit 206 (e.g., at a location between the upstream and downstream ends 214, 224 of the mixing conduit 206) extending between the DOC system 204 and the SCR system 208, such as at the location indicated by dashed lines 300A in FIG. 2. In such an embodiment, the flow mixer 300 may be used to impart spiraling flow trajectories to the reductant/exhaust flow expelled from the DOC system 204 to facilitate proper mixing of the reductant and engine exhaust prior to such flow being directed into the SCR system 208.

It should additionally be appreciated that, throughout the description, "about" is intended to mean within 10% of the associated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An exhaust treatment system for a work vehicle, the system comprising:
   a diesel oxidation catalyst (DOC) system configured to inject an exhaust reductant into engine exhaust;
   a mixing conduit coupled to the DOC system, the mixing conduit being configured to receive a mixture of the exhaust reductant and the engine exhaust from the DOC system;
   a selective catalytic reduction (SCR) system coupled to the mixing conduit, configured to react the mixture of the exhaust reductant and the engine exhaust received from the mixing conduit with a catalyst to generate a treated exhaust flow, the SCR system including an SCR outlet for expelling the treated exhaust flow therefrom;
   a flow conduit in fluid communication with the SCR outlet for receiving the treated exhaust flow expelled from the SCR system;
   an exhaust sensor positioned within the flow conduit downstream of the SCR outlet, the exhaust sensor being configured to detect an amount of an emission gas present in the treated exhaust flow; and
   a flow mixer positioned upstream of the exhaust sensor and within the SCR system, the flow mixer comprising:

an end wall defining sector openings extending in a circumferential direction of the flow mixer between a first sector side and a second sector side and in a radial direction of the flow mixer between a radially inner sector end and a radially outer sector end; and a plurality of swirler vanes, each of the plurality of swirler vanes extending in the circumferential direction from the first sector side of a respective one of the sector openings and in the radial direction between a radially inner vane end and a radially outer vane end, the radially outer vane end of each of the plurality of swirler vanes being spaced apart in the radial direction from the radially outer sector end of the respective one of the sector openings, wherein the plurality of swirler vanes is configured to impart a spiraling flow trajectory to the treated exhaust flow flowing from the SCR to the exhaust sensor.

2. The system of claim 1, wherein the radially inner and outer sector ends are spaced apart by a first radial distance, and the radially inner and outer vane ends are spaced apart by a second radial distance, wherein the second radial distance is about 80% of the first radial distance.

3. The system of claim 1, wherein the flow mixer is positioned adjacent to the SCR outlet.

4. The system of claim 1, wherein the flow mixer defines an upstream end and a downstream end along an axial direction, the downstream end of the flow mixer being positioned at the SCR outlet.

5. The system of claim 4, wherein the end wall is positioned at the upstream end of the flow mixer.

6. The system of claim 1, wherein the flow mixer further includes a cylindrical sidewall extending between the upstream and downstream ends of the flow mixer, the cylindrical sidewall defining a plurality of sidewall openings, each of the plurality of sidewall openings extending in an axial direction of the flow mixer across a first axial range, each of the plurality of swirler vanes extending in the axial direction across a second axial range, the first axial range at least partially overlapping the second axial range.

7. The system of claim 6, wherein the first axial range extends closer to the downstream end of the flow mixer than the second axial range.

8. The system of claim 6, wherein each of the sector openings is at least partially radially aligned with one or more of the plurality of sidewall openings.

9. The system of claim 1, wherein each of the plurality of swirler vanes extends at an angle of about 45° relative to the end wall.

10. The system of claim 1, wherein the sector openings are evenly spaced apart about a center axis of the end wall.

11. The system of claim 1, wherein the exhaust sensor is a nitrogen oxide (NOx) sensor.

12. An exhaust treatment system for a work vehicle, the system comprising:

a selective catalytic reduction (SCR) system configured to react a mixture of exhaust reductant and engine exhaust with a catalyst to generate a treated exhaust flow, the SCR system including an SCR outlet for expelling the treated exhaust flow therefrom;

a flow conduit in fluid communication with the SCR outlet for receiving the treated exhaust flow expelled from the SCR system;

an exhaust sensor positioned within the flow conduit downstream of the SCR outlet, the exhaust sensor being configured to detect an amount of an emission gas present in the treated exhaust flow; and a flow mixer positioned upstream of the exhaust sensor, the flow mixer extending between an upstream end and a downstream end along an axial direction, the flow mixer comprising:

a sidewall extending between the upstream and downstream ends, the sidewall defining a plurality of sidewall openings, each of the plurality of sidewall openings extending in the axial direction across a first axial range;

an end wall coupled to the sidewall proximate the upstream end, the end wall defining sector openings; and a plurality of swirler vanes, each of the plurality of swirler vanes extending in a circumferential direction of the flow mixer from adjacent a respective one of the sector openings and in the axial direction across a second axial range, the first axial range at least partially overlapping the second axial range, wherein the plurality of swirler vanes is configured to impart a spiraling flow trajectory to the treated exhaust flow flowing from the SCR to the exhaust sensor.

13. The system of claim 12, wherein the downstream end of the flow mixer is positioned at the SCR outlet.

14. The system of claim 12, wherein each of the plurality of swirler vanes extends at an angle of about 45° relative to the end wall.

15. The system of claim 12, wherein the sector openings are evenly spaced apart in a circumferential direction of the flow mixer about a center axis of the end wall.

16. The system of claim 12, wherein the sector openings extend in a radial direction of the flow mixer across a first radial distance and each of the plurality of swirler vanes extends in the radial direction across a second radial distance, the second radial distance being less than the first radial distance.

17. The system of claim 12, wherein radially outer ends of the sector openings are spaced apart in a radial direction of the flow mixer from radially outer ends of the plurality of swirler vanes.

18. A flow mixer for use within an exhaust treatment system of a work vehicle, the flow mixer comprising:

a sidewall extending between an upstream end and a downstream end along an axial direction, the sidewall defining a plurality of sidewall openings, each of the plurality of sidewall openings extending in the axial direction across a first axial range;

an end wall coupled to the sidewall proximate the upstream end, the end wall defining sector openings extending in a radial direction of the flow mixer across a first radial distance; and a plurality of swirler vanes, each of the plurality of swirler vanes extending in a circumferential direction of the flow mixer from a respective one of the sector openings and in the radial direction across a second radial distance and in the axial direction across a second axial range, wherein the second radial distance is less than the first radial distance, and wherein the first axial range at least partially overlaps the second axial range.

19. The flow mixer of claim 18, wherein the first axial range extends closer to the downstream end of the flow mixer than the second axial range.

20. The flow mixer of claim 18, wherein radially outer sector ends of the sector openings are spaced apart from radially outer vane ends of the plurality of swirler vanes.

* * * * *